United States Patent
Roach

(10) Patent No.: US 10,795,950 B2
(45) Date of Patent: Oct. 6, 2020

(54) NETWORK CONTENT POLICY PROVIDING RELATED SEARCH RESULT

(75) Inventor: Perry Roach, Guelph (CA)

(73) Assignee: NETSWEEPER (BARBADOS) INC., St. Michael (BB)

( * ) Notice: Subject to any disclaimer, the term of this patent is extended or adjusted under 35 U.S.C. 154(b) by 625 days.

(21) Appl. No.: 14/418,358

(22) PCT Filed: Aug. 3, 2012

(86) PCT No.: PCT/CA2012/000729
§ 371 (c)(1),
(2), (4) Date: Apr. 2, 2015

(87) PCT Pub. No.: WO2014/019052
PCT Pub. Date: Feb. 6, 2014

(65) Prior Publication Data
US 2015/0278373 A1    Oct. 1, 2015

(51) Int. Cl.
*G06F 16/9535* (2019.01)
*H04L 29/06* (2006.01)

(52) U.S. Cl.
CPC ........ *G06F 16/9535* (2019.01); *H04L 63/104* (2013.01); *H04L 63/101* (2013.01); *H04L 63/1441* (2013.01)

(58) Field of Classification Search
None
See application file for complete search history.

(56) References Cited

U.S. PATENT DOCUMENTS

| | | | |
|---|---|---|---|
| 6,442,577 B1 | 8/2002 | Britton et al. | |
| 6,516,315 B1* | 2/2003 | Gupta | G06F 21/6218 |
| 7,778,874 B1* | 8/2010 | Saunders | G06Q 30/02 |
| | | | 705/14.66 |
| 7,954,144 B1 | 5/2011 | Ebrahimi et al. | |
| 7,958,258 B2 | 6/2011 | Yeung et al. | |
| 9,083,727 B1* | 7/2015 | Stamos | H04L 63/126 |
| 2005/0144297 A1 | 6/2005 | Dahlstrom et al. | |
| 2008/0086555 A1* | 4/2008 | Feinleib | G06F 17/30705 |
| | | | 709/224 |
| 2011/0072039 A1* | 3/2011 | Tayloe | G06F 21/6218 |
| | | | 707/769 |
| 2011/0231772 A1* | 9/2011 | Tovar | H04L 63/10 |
| | | | 715/736 |

(Continued)

FOREIGN PATENT DOCUMENTS

| | | |
|---|---|---|
| WO | 03/001324 | 1/2003 |
| WO | 2009/117733 | 9/2009 |
| WO | 2011/004258 | 1/2011 |

OTHER PUBLICATIONS

International Search Report for corresponding International Application No. PCT/CA2012/000729, dated May 2, 2013.

(Continued)

*Primary Examiner* — Uyen T Le
(74) *Attorney, Agent, or Firm* — Gardner Linn

(57) ABSTRACT

Methods, computer systems, and computers for responding to requests for content that is subject to network policy can provide a landing page that displays a search result related to the requested content. The landing page can be specific to one or more of the content being requested and the identity of a user making the request.

41 Claims, 5 Drawing Sheets

(56) References Cited

U.S. PATENT DOCUMENTS

| | | | | |
|---|---|---|---|---|
| 2011/0246634 | A1* | 10/2011 | Liu | G06F 17/30861 709/223 |
| 2012/0233656 | A1* | 9/2012 | Rieschick | H04W 12/08 726/1 |
| 2013/0346302 | A1* | 12/2013 | Purves | G06Q 20/102 705/40 |
| 2015/0120915 | A1* | 4/2015 | Erb | H04L 63/20 709/224 |
| 2015/0143453 | A1* | 5/2015 | Erb | H04L 63/102 726/1 |
| 2019/0122266 | A1* | 4/2019 | Ramer | G06Q 30/0256 |

OTHER PUBLICATIONS

European Search Report for corresponding European Application No. 12882523.9, dated Apr. 2, 2016.

European Search Report for corresponding European Application No. 12882523.9, dated Feb. 4, 2016.

European Supplementary Search Report for European Application No. EP13797896.1, dated Dec. 16, 2015.

Search Report and Examination Report of the International Searching Authority (Korea), dated Nov. 14, 2018, for Application No. UAE/P/ 0156/2015.

European Examination Report for European Application No. EP12882523.9, dated Dec. 6, 2018.

"Google Ads Policies," Support.google.com, Jun. 16, 2014, https://support.google.com/adspolicy/answer/6008942?nl=en.

CIPO, Examination Report, dated Jun. 19, 2019, re Canadian Patent Application No. 2880632.

International Preliminary Report on Patentability dated Feb. 3, 2015 for Related International Patent Application No. PCT/CA2012/000729.

CIPO, Examination Report, dated Aug. 1, 2018, re Canadian Patent Application No. 2880632.

* cited by examiner

| POLICY DATABASE 120 | | |
|---|---|---|
| URL 122 | CAT. 124 | POLICY 126 |
| http://www.badsite.com | malicious | warn |
| http://www.zombo.com | business | allow |
| http://www.pugilism.com | violence | deny |
| ... | ... | ... |
| http://www.goodsite.com | crafts | allow |

*Fig. 5*

| POLICY DATABASE 130 | | | |
|---|---|---|---|
| URL 122 | IDENTITY 132 | CAT. 124 | POLICY 126 |
| http://www.badsite.com | student | malicious | deny |
| http://www.badsite.com | teacher | malicious | warn |
| http://www.badsite.com | admin | malicious | allow |
| ... | ... | ... | ... |
| http://www.goodsite.com | | crafts | allow |

*Fig. 6*

| POLICY DATABASE 140 | | |
|---|---|---|
| KEYWORDS/PHRASES 142 | CAT. 124 | POLICY 126 |
| bad sites | malicious | warn |
| bad web sites | malicious | warn |
| malware | malicious | warn |
| ... | ... | ... |
| fighting movies | violence | warn |

*Fig. 7*

| POLICY MESSAGE 152 | There was a virus detected on the... |
|---|---|
| POLICY MESSAGE 154<br><br>The web site located at www.badsite.com appears to host malicious content.<br><br>Be aware that malicious software... | SEARCH RESULTS<br>156<br><br>SEARCH INPUT 158    www.badsite.com ⇨<br><br>How to avoid bad sites<br>www.howtoavoidbadsites.com<br>A guide to avoiding bad web sites...<br><br>A brief history of malware<br>www.historyofmalware.org<br>Table of contents 1. The first virus...<br><br>Kolinsky Antivirus<br>www.kolinskyantivirus.com<br>The number #1 web thread management... |

*Fig. 8*   150

| POLICY MESSAGE 152 | There was a virus detected on the... |
|---|---|
| POLICY MESSAGE 154<br><br>The web site located at www.badsite.com appears to host malicious content.<br><br>Be aware that malicious software... | CONTINUATION MESSAGE 162<br>Click www.badsite.com if you are sure you wish to proceed.<br><br>SEARCH RESULTS<br>156<br><br>How to avoid bad sites<br>www.howtoavoidbadsites.com<br>A guide to avoiding bad web sites...<br><br>A brief history of malware<br>www.historyofmalware.org<br>Table of contents 1. The first virus...<br><br>Kolinsky Antivirus<br>www.kolinskyantivirus.com<br>The number #1 web thread management... |

NETWORK CONTENT POLICY PROVIDING RELATED SEARCH RESULT

TECHNICAL FIELD

This disclosure relates to computers and, more specifically, to network policy services.

BACKGROUND ART

Network policies can be used to prevent undesirable material from being retrieved by a computer. Such material can include malicious code that detrimentally modifies the behaviour of the retrieving computer or adult-oriented material that is unsuitable for viewing by a child that has access to the computer.

Enforcing network policy is known to be done using domain name service (DNS) redirection, in which a request for a web site is redirected to a host that filters or blocks the material at the web site. One disadvantage of this approach is that all requests to a specific Internet protocol (IP) address or domain are affected, when only one or a few pages hosted at the IP address may be the target of the policy. Thus, DNS redirection is too coarse, particularly when applied IP addresses that host a large amount of varied material.

Informing the user of the computer that their request was subjected to policy is known. However, current methods of doing so do not provide users with sufficient and intuitive options as to how to proceed after a request for material has been blocked.

SUMMARY OF INVENTION

Methods, computer systems, and computers for responding to requests for content that is subject to network policy are disclosed.

Responding to a content request can include providing a landing page that displays a search result related to the requested content. The landing page can be specific to one or more of the content being requested and the identity of a user making the request.

BRIEF DESCRIPTION OF DRAWINGS

The drawings illustrate, by way of example only, embodiments of the present disclosure.

FIGS. 5-7 are table of policy databases.

FIG. 8 is a diagram of a landing page.

FIG. 9 is a diagram of another landing page.

DESCRIPTION OF EMBODIMENTS

The techniques described herein can allow for more granular policy enforcement than what is achievable using DNS redirect. This advantageously allows policy to be enforced on the basis of web pages. Moreover, policies can be also based on user identity and can be provided in a way that provides an intuitive path forward for users.

Figure 1:
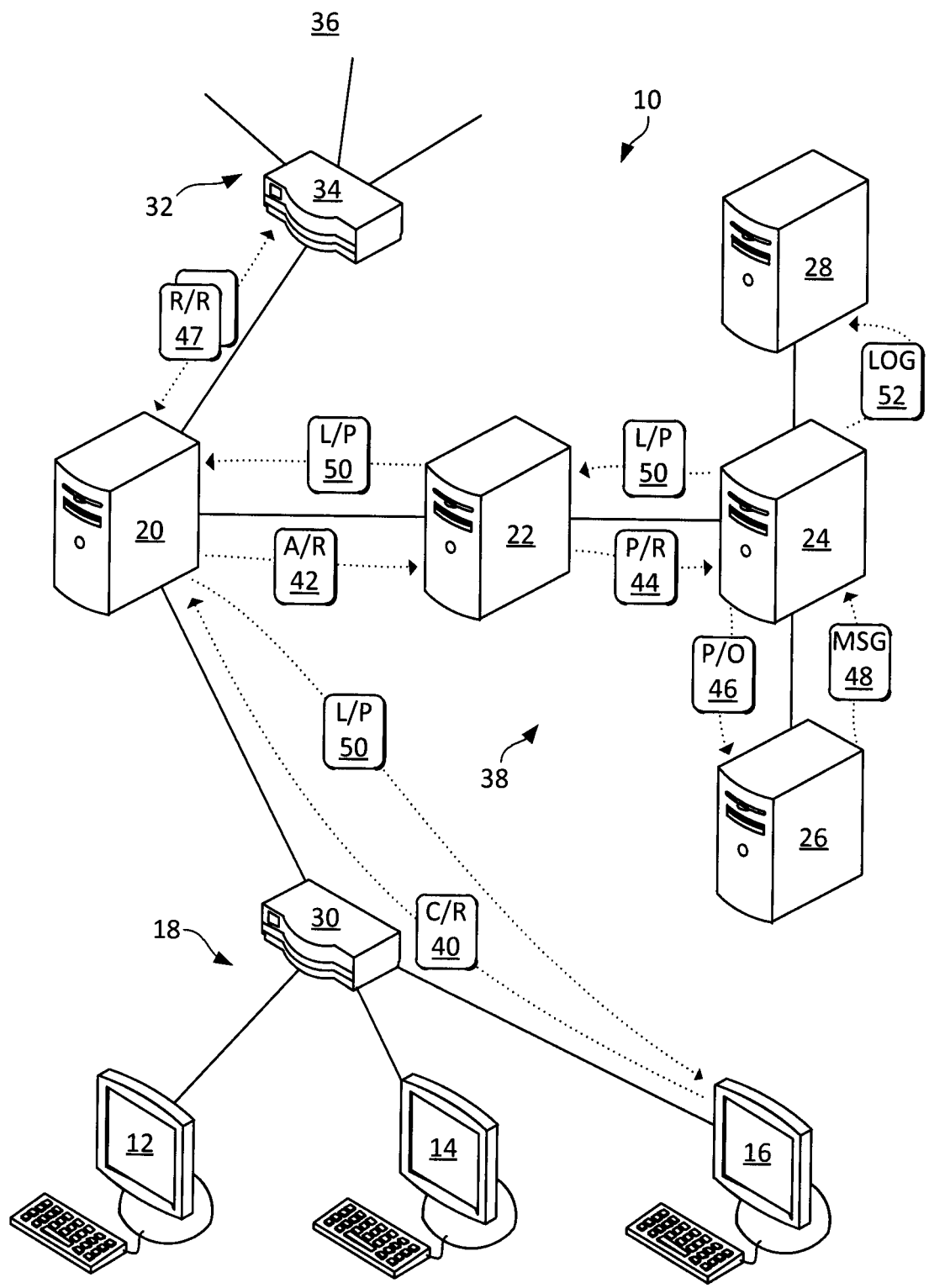
FIG. 1 is a network diagram of a computer system.

FIG. 1 is a diagram illustrating a computer system 10, in accordance with an embodiment of this disclosure.

The computer system 10 can include multiple client computers 12, 14, 16, a network 18, a gateway server 20, an interceptor server 22, a policy server 24, a message server 26, and a log server 28.

The network 18 connects the client computers 12, 14, 16 to the gateway server 20. Such a network 18 may include network devices such as hubs, routers, network cables, wireless access points, fiber-optic lines, and the like, as generally indicated at 30. In one example, the network 18 may be a private intranet under the control and administration of an organization such as a corporation or institution, with the client computers 12, 14, 16 being workstations exclusively used by individuals belonging to such organization. In another example, the network 18 may be accessible to client computers under the control and administration of different organizations, and as such the network 18 may be a public or semi-public network. That is, the gateway server 20 may be accessible to the client computers 12, 14, 16 using login credentials over a public network, such as the Internet. Irrespective of the specific structure of the network 18, the network 18 provides for data communication between the client computers 12, 14, 16 and the gateway server 20.

The gateway server 20 connects the network 18, and thus the client computers 12, 14, 16, to a content network, generally indicated at 32. The content network 32 includes a plurality of routers and other network devices, generally represented at 34, that provides for data communication between the gateway server 20 and sources of content, generally shown at 36. The gateway server 20 may further include additional network devices such as hubs, routers, network cables, wireless access points, fiber-optic lines, and the like, but these are omitted from the figure for clarity and will not be discussed in detail. The network 32 can be the Internet.

Sources of content 36 accessible to the client computers 12, 14, 16 via the gateway server 20 include web servers, file transfer protocol (FTP) servers, streaming media servers, and the like. As such the content available includes web pages, files, streaming video and audio, and similar content.

The interceptor server 22, policy server 24, message server 26, and log server 28 may form a policy service network 38, which may include network devices such as hubs, routers, network cables, wireless access points, fiber-optic lines, and the like, which are omitted from the figure for clarity. In some embodiments, the gateway server 20 forms part of the policy service network 38. In some embodiments, policy service network 38 may serve any of multiple different content-consumer networks 18 and multiple different content-source networks 32.

In some embodiments, any two or more of the networks 18, 32, 38 may be part of the same larger network, such as the Internet. In some embodiments, the networks 18 and 38 are part of a large organisation's wide-area network.

The gateway server 20 is configured to receive content requests 40 from the client computers 12, 14, 16 to access web sites or other resources 36 accessible via the content network 32. The gateway server 20 is further configured to either explicitly redirect content requests 40 to the interceptor server 22 in the form of access requests 42 or to transparently copy the content requests 40 to the interceptor server 22 in the form of outbound access requests 42. Any given content request 40 can include a network location of the requested content, such as a uniform resource locator (URL), that has had an associated link clicked, has been typed in, or has otherwise been selected via a web browser, or other user agent, at the requesting client 12, 14, 16.

Content requests 40 can alternatively include information submitted by the client computers 12, 14, 16 using a request method, such as the (hypertext transfer protocol) HTTP POST method, the HTTP GET method, or similar. Such information can include search keywords/phrases provided that are to be provided to a search engine to carry out a search.

The interceptor server 22 is configured to authenticate the requesting client computer 12, 14, 16 based on access credentials associated with the requesting client computer 12, 14, 16. The access credentials may be an IP address of the requesting computer 12, 14, 16, a username and a password combination entered by a user of the requesting computer 12, 14, 16, or similar. The access credentials can form the basis of an identity of the user of the requesting computer 12, 14, 16.

The interceptor server 22 is further configured to verify the access credentials by matching them with pre-stored verification information, such as IP addresses, encrypted or hashed version of passwords, or similar. The interceptor server 22 may maintain a database of such verification information in association with identifying information of users of the client computers 12, 14, 16, including any of organizational information, such organizational role and job title; demographic information, such sex, location, ethnicity, and age; and personal information, such as name, date of birth, employee number, student identification number, and the like. The interceptor server 22 can thus use the access credentials originating from the requesting computer 12, 14, 16 to determine the identity of the user of the requesting computer 12, 14, 16. In some embodiments, the access credentials themselves may be taken as the identity.

The identity may be reasonably unique to the user, such as name or identification number, or may be a broader group-based characteristic, such as the user's age group or sex. The identity may include a combination of several characteristics, such as age and organizational role (e.g., minor student, student at age of majority, and teacher).

If the requesting computer 12, 14, 16 is authenticated, the interceptor server 22 is further configured to send a policy request 44 that includes the determined user identity along with the content request 40 to the policy server 24. Identities, and particularly group-based identities, are discussed in WO2011/004258, which is incorporated herein by reference.

The policy server 24 is configured to determine whether a restrictive policy applies to the requested content. Restrictive policy may be based on the identity of the user and the requested content or may be based on the requested content without regard to the identity of the user (e.g., all users are subject to the same policy). In one embodiment, the policy server 24 stores a policy database that associates URLs and identities to policies (see FIG. 6). In another embodiment, the policy database associates search keywords/phrases to policies (see FIG. 7). This allows fine-grained application of policy to content located at different URLs or content associated with certain search keywords/phases.

The requested URL or keywords/phrases and identity, if used, received from the interception server 22 is then used in a database query to obtain any resulting policy. When no restrictive policy applies, the policy server 24 can be configured to indicate such to the interception sever 22, which is configured to indicate to the gateway server 20 that the content request 40 is not subject to restrictive policy and can be handled normally, as requests for and responses of content, indicated at 47.

Polices can be based on individual users or can group-based, such as described in WO2011/004258. The policy server 24 is configured to send a policy output 46, which identifies the requested URL or search keyword/phrase, to the message server 26.

The message server 26 is configured to construct a policy message 48 in response to the policy output 46. The policy message 48 includes at least a search query that is based on the policy output 46 and, specifically, based on the URL or search keyword/phrase in the policy output 46, which originated from the client computer 12, 14, 16 with the request 40.

The message server 26 can construct the search query in various ways. In one embodiment, search query includes a URL of a search engine, with such URL including search parameters based on the originally requested URL or search keywords/phrase in the content request 40. For example, if the user of the requesting computer 12, 14, 16 clicks or inputs a hyperlink that causes the content request 40 to specify http://www.badsite.com then the message server 26 constructs a search query of http://www.searchengine.com/search%3Fq=www.badsite.com so as to indicate a search results page that would have been obtained had the user of the client computer 16 instead clicked or inputted a search string "www.badsite.com" into the search engine hosted at "www.searchengine.com". (The string"%3F" is a URL code for the symbol "?" which denotes an initial key-value parameter.)

In another example, if the user of the requesting computer 12, 14, 16 enters the text bad web sites into a form of the search engine located at "www.badsearchengine.com" and presses submit, or otherwise initiates a search, the message server 26 constructs a search query of http://www.searchengine.com/search%3Fq=bad+web+sites so as to indicate a search results page that would have been obtained had the user of the client computer 16 instead used a different search engine to conduct this search. This can advantageously allow a user to be steered away from a search engine that perhaps provides high ranking hits to web sites that violate policy and towards a search engine that provides high ranking hits to web sites that conform to policy.

The message server 26 includes the search query in the policy message 48, which is then sent to the policy server 24.

The policy server 24 is configured to receive the policy message 48 and, in response, obtain a location 50 of a dynamically generated landing page (see FIGS. 8 and 9). Obtaining the location 50 of the landing page can include constructing a URL for the landing page, which may be hosted at the policy server 24, the message server 26, another of the servers 22, 28, or a different server. The landing page 50 contains a human-readable message indicative of the applied policy as well as a display element, such as an iframe, for the search result. The search query can be included in the landing page location 50 as, for example, a parameter in the URL of the landing page. The search query can be provided to the landing page in other ways, depending on the technique used to dynamically generate the landing page.

For example, if the applied policy pertains to malicious code or malware and the search query is as above, namely http://www.searchengine.com/search%3F=www.badsite.com then the landing page location 50 may be expressed as http://malwarelandingpage.netsweeper.com?show=www.searchengine.com/search%3Fq=www.badsite.com in which the search query is passed as a value of the parameter key "show" so that a script may provide the iframe, or other display element, of the dynamically generated landing page with the search query, so that the iframe in the landing page can display the search result.

The policy server 24 is configured to forward the landing page location 50 to the gateway server 20, which is configured to provide the landing page location 50 in response to the content request 40. This may be achieved by the policy server 24 sending an HTTP 302 response to gateway server 20 with the landing page location 50 contained in the header of the HTTP 302 response.

When the requesting computer 12, 14, 16 receives the landing page location 50 in response to the content request 40, the requesting computer 12, 14, 16 displays the landing page in its web browser or other user agent. As a result, when the content request 40 is governed by restrictive policy, the user of the client computer 12, 14, 16 that made the content request 40 is shown a landing page 50 that contains a search result related to the content request 40.

Links in the search results may be clicked, or otherwise selected by the user, to initiate subsequent content requests 40, which are handled as described above. Accordingly, the gateway server 20 allows such a content request 40 and provides content in return, as indicated at 47, when such content request 40 is not restricted by policy. Conversely, a subsequent landing page will be provided if a link in the landing page results in a content request 40 that is subject to restrictive policy.

The policy server 24 may further be configured to send logging information 52 regarding any one or more of policy requests 44, policy outputs 46, policy messages 48, and landing page locations 50 to the log server 28, which is configured to store log entries for future reference. The logging information 52 may include the contents of the policy requests 44, policy outputs 46, policy messages 48, or landing page locations 50.

In other embodiments, more or fewer servers than the servers 20-28 are used. Functionality described herein with respect to several servers can be performed by fewer servers or even a single server, with any associated communications between physical servers described herein being configured instead as communications between processes or being subsumed.

Figure 2:
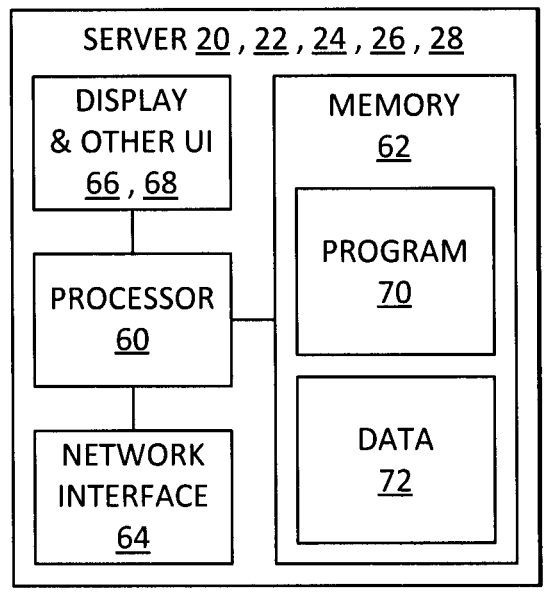
FIG. 2 is a block diagram of a server.

FIG. 2 shows an example computer that can be used as any of the gateway server 20, interceptor server 22, policy server 24, message server 26, and log server 28. The server can include a processor 60, memory 62, a network interface 64, and can further include a display 66 and other user interface components 68. The processor 60, memory 62, network interface 64, and display 66 and other user interface 68 are electrically interconnected and can be physically contained within a housing or frame. The server may be computer such as a rack-mount server, blade server, tower server, or another kind of computer, or a process or program running on such a computer.

The processor 60 is configured to execute instructions, which may originate from the memory 62 or the network interface 64. The processor 60 may be known a central processing unit (CPU). The processor 60 can include one or more sub-processors or processing cores.

The memory 62 includes a non-transitory computer-readable medium that is configured to store programs and data. The memory 62 can include one or more short-term or long-term storage devices, such as a solid-state memory chip (e.g., DRAM, ROM, non-volatile flash memory), a hard drive, an optical storage disc, and similar. The memory 62 can include fixed components that are not physically removable from the server (e.g., fixed hard drives) as well as removable components (e.g., removable memory cards). The memory 62 allows for random access, in that programs and data may be both read and written.

The network interface 64 is configured to allow the server to communicate with other computers across a network. The network interface 64 can include one or more of a wired and wireless network adaptor and well as a software or firmware driver for controlling such adaptor.

The display 66 and other user interface components 68, if provided, can include a display device, such as a monitor, a bank of light-emitting diodes (LEDs), or similar for monitoring operations of the server. The user interface 68 can include an input device, such as a keyboard, mouse, touch-sensitive element of a touch-screen display, or similar device. The user interface 68 can be remote to the server and provided via the network interface 64 to a client computer operated by a remote administrator.

Although the servers 20-28 may have similar components, as described above, each server 20-28 may be configured in a manner selected for its purpose as described elsewhere herein. For example, the policy server 24 may be configured for high storage capacity (e.g., much memory 62), while the interceptor server 20 may be configured for high processing speed (e.g., multiple advanced processors 60).

One or more programs 70 can be provided to each of the servers 20-28 to carry out the processes described herein. Such programs 70 may reference data 72 in the form of databases, files, or other data structures.

Figure 3:
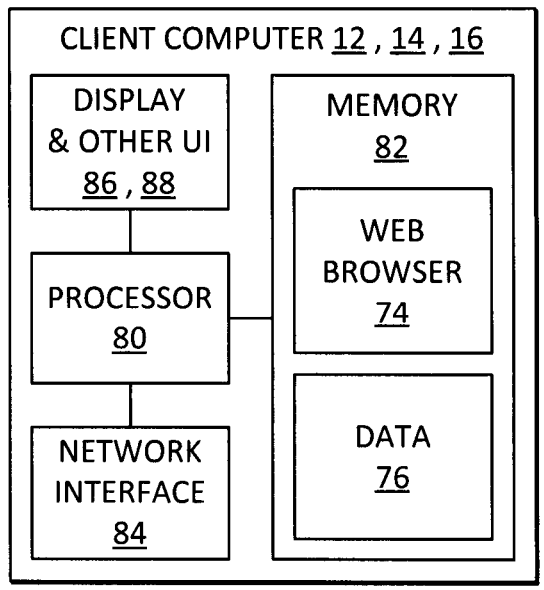
FIG. 3 is a block diagram of a client computer.

FIG. 3 shows an example computer that can be used as any of the client computers 12, 14, 16. The computer includes a processor 80, memory 82, a network interface 84, and a display 86 and other user interface components 88. The processor 80, memory 82, network interface 84, and display 86 and user interface 88 are electrically interconnected and can be physically contained within a housing or frame. The client computers 12, 14, 16 may each be a computer such as a desktop computer, notebook computer, tablet computer, smart phone, netbook, video game or entertainment console, and the like.

The processor 80 is configured to execute instructions, which may originate from the memory 82 or the network interface 84. The processor 80 may be known a CPU. The processor 80 can include one or more sub-processors or processing cores.

The memory 82 includes a non-transitory computer-readable medium that is configured to store programs and data. The memory 82 can include one or more short-term or long-term storage devices, such as a solid-state memory chip (e.g., DRAM, ROM, non-volatile flash memory), a hard drive, an optical storage disc, and similar. The memory 82 can include fixed components that are not physically removable from the client computer (e.g., fixed hard drives) as well as removable components (e.g., removable memory cards). The memory 82 allows for random access, in that programs and data may be both read and written.

The network interface 84 is configured to allow the client computer 14, 16 to communicate with other computers across a network. The network interface 84 can include one or more of a wired and wireless network adaptor and well as a software or firmware driver for controlling such adaptor.

The display 86 and other user interface components 88 can include a display device, such as a monitor and an input device, such as a keyboard, keypad, mouse, touch-sensitive element of a touch-screen display, or similar device. Although the term "click" is used herein with respect to links (hyperlinks), this term should be taken to mean any user interface action that follows a hyperlink.

Each of the client computers 12, 14, 16 is configured to run a web browser 74 or other user agent suitable for the type of content being accessed. The web browser 74 may reference locally stored data 76, such as cookies, saved login credentials, and similar.

Figure 4:
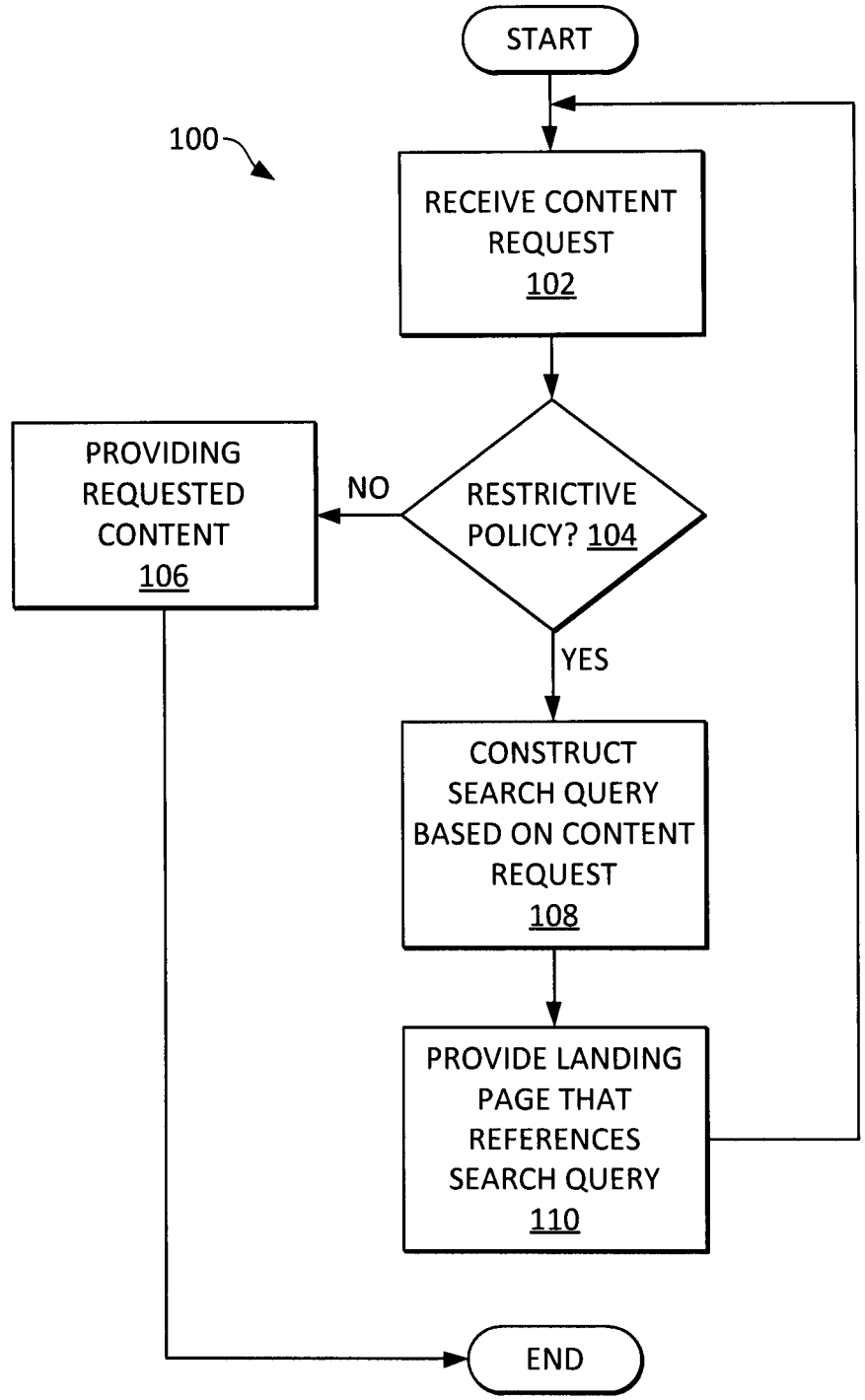
FIG. 4 is a flowchart of a method of providing a landing page.

Referring to FIG. 4, a method 100 for displaying search results associated with policy-restricted content is shown. Although, the method 100 is discussed in the context of the computer system 10 of FIG. 1 for explanatory purposes, other computer systems may be used.

At 102, a content request for network access to content accessible via a network is received from a requesting computer, such as one of the client computers 12, 14, 16 (FIG. 1). The content request can include a network location of the content (e.g., a URL specifying a web page, an FTP location, or similar) or other indication of the desired content, such as keywords/phrase entered into a search engine.

The content request may further include an identity associated with the requesting computer 12, 14, 16. The identity may be based on the network address (e.g., IP address) of the requesting computer 12, 14, 16, so that anyone using the requesting computer is subject to the same policy. The identity may be based on the login credential of a user of the requesting computer 12, 14, 16, so that specific users can have specific policies. The network address or login credential may be used to look up identifying information (e.g., age, role, job title, etc.) about the user of the requesting computer 12, 14, 16, and this may be or form part of the user identity.

Then, at 104, it is determined whether the content request is subject to a restrictive policy. A policy database may be queried. FIG. 5 shows an example of a policy database 120 that stores associations between URLs 122, content categories 124, and policies 144. Policies for URLs shown as "allow" and "deny" respectively allow access to the desired content and deny access to the desired content. An example of a restrictive policy includes a policy that provides a warning or attempts to steer users away from specific content. In the example depicted, "warn" is used to indicate that a web site is subject to restrictive policy. Restrictive policy may be applied in, for example, cases where web sites are known to host potentially malicious code, such as viruses, malware, or Trojans, that may detrimentally affect performance of the computer 12, 14, 16 and a network over which it communicates.

Another restrictive policy may additionally specify an identity 132 of the user making the content request, as shown by policy database 130 of FIG. 6. For example, users of different groups, e.g., "student", "teacher", and "admin", can be subject to different policy for the same site. One group is outright denied access to the site (and served a deny page, if appropriate), another group is subject to a restrictive policy, and yet another group is allowed to view the site without hindrance.

Yet another restrictive policy may specify keywords/phrases 142 instead of URLs, as shown by policy database 140 of FIG. 7. A keyword or phrase may be submitted by the user conducting a search at a search engine, and it may be advantageous to assert policy on keywords/phrases when the resulting search results contain a high number of web sites that are also subject to restrictive policy.

Features and aspects of each policy database 120, 130, and 140 may be combined with each other and further combined with other policy features and aspects described elsewhere herein.

When the content requested is not subject to a restrictive policy (and also not outright denied or blocked), then the request content is provided, at 106, to the requesting computer 12, 14, 16.

On the other hand, when the content requested is subject to a restrictive policy (e.g., "warn"), then, at 108, a search query is constructed based on the content request.

If the content request contains a URL that was entered into the address bar of the web browser 74 or a URL from a link that was followed by the computer 12, 14, 16, then the search query can be a string that identifies a the location of a search engine and the URL, or a modified version thereof, that is to be passed to the search engine to execute the search. Examples of such are given elsewhere in this disclosure.

It may be useful to modify the URL of the content the request in various ways for various reasons. First, a URL can be reduced to its second-level domain by, for example, stripping off the top-level domain, e.g., ".com", and the subdomain, e.g., "www.", so that the URL "www.badsite.com" would become "badsite". This can advantageously catch other references to the web site "www.badsite.com" that the user is also to be guided away from, as well as alternate versions of the site hosted at other locations, such as "www.badsite.org".

Second, if a URL contains parameters, which typically take the form of key-value pairs, e.g., "?catalogpage=5&item=38", then any or all of these parameters can be stripped from the URL before it is included in the search query. For example, the URL "www.badsite.com?catalogpage=5&item=38" would become "www.badsite.com". This is advantageous in that commonly accessed landing pages can be cached at a server, thereby saving processing and storage resources by avoiding repeatedly dynamically generating substantially the same landing page for a multitude of different parameter values and combinations.

It may also be beneficial to add parameters to the search query, such parameters known to eliminate or reduce the occurrence of search result hits for the URL, since this may further steer the user away from the undesirable site. For example, the search query can further include a parameter such as "-site:www.badsite.com" to eliminate or reduce links to "www.badsite.com" in the search results.

If the content request contains a text string that was submitted using a request method, such as HTTP POST or GET, then the search query can be a string that identifies the location of a search engine and includes the submitted text string. This can advantageously allow a search query made to an initial search engine to be fed to a different search engine and, particularly, a search engine that returns fewer results that would be subject to policy (e.g., fewer web sites containing malicious code, in this example).

Then, at 110, the original content request is responded to with a network location of a landing page configured to display a search result of the search query constructed at 108. The search result can be displayed in association with a message indicative of the restrictive policy that caused the landing page to be displayed, as shown in FIGS. 8 and 9.

The method 100 then begins anew by waiting for the user of the computer 12, 14, 16 to subsequently request content, which may be the related content provided in the search result of the landing page. When a subsequent request is made at the landing page by the requesting computer 12, 14, 16, the subsequent request is compared to policy at 104. If no respective (or deny) policy applies, then the subsequent request is responded to with the related content, at 106, the user is advantageously taken to content that is similar to what was originally requested but which conforms to policy, and the method 100 ends.

FIG. 8 shows an example of a landing page 150, as displayed in the web browser 74 of a requesting computer 12, 14, 16. The landing page 150 may be dynamically generated (e.g., by a script or other program, such as PHP, Ruby on Rails, Microsoft ASP, and the like) and provided to the web browser 74 as an HTML/CSS document.

The landing page 150 can include one or more policy message display elements 152, 154 that visually indicate to the user of the requesting computer 12, 14, 16 that their original content request (e.g., clicked/typed URL or searched keywords/phrases) was found to be subject to a restrictive policy.

Moreover, when the landing page 150 is generated, a link to the requested content is excluded from the landing page 150. This can be advantageous when users may need more guidance to avoid content subject to restrictive policy, in that users are not provided with a convenient way to click-through the landing page 150 to arrive at the originally requested content.

The landing page 150 includes the search results 156, which can be presented in an element, such as an iframe. This allows for the search results 156 to be displayed as if they were obtained from an original search initiated by the user. Furthermore, a search input element (e.g., a textbox) and submit element (e.g., submit button) may be provided, as indicated at 158, with the search input element being pre-populated with the original search.

FIG. 9 shows an example of another landing page 160, as displayed in the web browser 74 of a requesting computer 12, 14, 16. The landing page 160 differs from the landing page 150, in that the landing page 160 does not include the search input and submit elements 158. Moreover, the landing page 160 includes a continuation message element 162 that provides a link to the content originally requested along with an additional cautionary message, so that the user may advantageously click past the landing page after being cautioned.

The link presented in the continuation message element 162 to the content originally requested may lead to an intermediate page that provides a final link to the originally requested content juxtaposed with a disclaimer that warns the user that the Internet service provider cannot be held responsible should the user still continue to the content originally requested.

In both example landing pages 150, 160, the search results 156 are presented in an iframe and appear as if the user had originally conducted the search. This is advantageous in that the search provider remains in control of the presentation and content of the search results 156 and the publisher of the landing page 150, 160 need not maintain a presentation and content engine to generate custom search results for landing pages.

In any of the embodiments above, a tracking parameter may be appended to the search query. The tracking parameter carries through to the links of the search results shown in the landing page. If the user of the computer 12, 14, 16 that displays the landing page clicks such a link, the search provider can detect the tracking code to build a metric as to how much traffic is generated by such landing pages and for what searches and categories of content. Such a metric can also be used to bill the search provider on a per-click basis in return for publishing the landing pages.

An example tracking parameter is "pc=NETS" and an example of a search query that bears the tracking parameter and that can be constructed according to the principles described herein is http://www.searchengine.com/search%3Fq=www.badsite.com %26pc=NETS where "%26" is a URL code for the symbol "&" which denotes a subsequent key-value parameter.

Although in the description above, the example of malicious code bearing web sites was referenced, other categories of network content are applicable as well, such as web sites that contain content that promotes or encourages drug use, illegal activities, cultural insensitivity, hate speech, violence, suicide or self harm, or similar.

While the foregoing provides certain non-limiting example embodiments, it should be understood that combinations, subsets, and variations of the foregoing are contemplated. The monopoly sought is defined by the claims.

The invention claimed is:

1. A method comprising:
receiving from a requesting computer a content request for network access to content accessible via a network;
when determining that the content request is subject to a restrictive policy, constructing a search query which conforms to the restrictive policy to which the content request is subject; and
responding to the content request with a network location of a landing page, the landing page configured to display a search result of the search query, wherein the search result includes content which conforms to the restrictive policy, the search result displayed in association with a message indicative of the restrictive policy.

2. The method of claim 1 further comprising:
receiving from the requesting computer a subsequent request for network access to related content accessible via the search result; and
responding to the subsequent request with the related content.

3. The method of claim 1, wherein the content request comprises a network location of the content.

4. The method of claim 1, wherein the content request comprises an identity associated with the requesting computer.

5. The method of claim 4, wherein the identity is based on a network address of the requesting computer.

6. The method of claim 4, wherein the identity is based on a login credential of a user of the requesting computer.

7. The method of claim 1, further comprising including a link to the content on the landing page.

8. The method of claim 1, further comprising excluding a link to the content from the landing page.

9. The method of claim 1, wherein the landing page comprises an iframe in which the search result is displayable.

10. The method of claim 1, further comprising configuring the search result to appear as an original search result.

11. The method of claim 1, wherein the policy is configured for malicious content.

12. A non-transitory computer-readable medium comprising processor-executable instructions configured to perform the method of claim 1.

13. A computer system comprising:
at least one computer configured to:
receive a content request for network access to content accessible via a network;
when determining that the content request is subject to a restrictive policy, construct a search query which conforms to the restrictive policy to which the content request is subject; and
respond to the content request with a network location of a landing page, the landing page configured to display a search result of the search query, wherein the search result includes content which conforms to the restrictive policy, the search result displayed in association with a message indicative of the restrictive policy.

14. The computer system of claim 13, wherein the at least one computer comprises:
a client computer having a web browser configured to make the content request; and
at least one server configured to receive the content request, construct the search query, and respond to the content request.

15. The computer system of claim 14, wherein the content request comprises an identity associated with the client computer.

16. The computer system of claim 15, wherein the identity is based on a network address of the client computer.

17. The computer system of claim 15, wherein the identity is based on a login credential of a user of the client computer.

18. The computer system of claim 13, wherein the at least one computer is further configured to:
receive a subsequent request for network access to related content accessible via the search result; and
respond to the subsequent request with the related content.

19. The computer system of claim 13, wherein the content request comprises a network location of the content.

20. The computer system of claim 13, wherein the at least one computer is further configured to include a link to the content on the landing page.

21. The computer system of claim 13, wherein the at least one computer is further configured to exclude a link to the content from the landing page.

22. The computer system of claim 13, wherein the landing page comprises an iframe in which the search result is displayable.

23. The computer system of claim 13, wherein the at least one computer is further configured to configure the search result to appear as an original search result.

24. The computer system of claim 13, wherein the policy is configured for malicious content.

25. A method comprising:
receiving from a requesting computer a content request to a first search engine for network access to content accessible via a network;
when determining that the content request is subject to a restrictive policy, obtaining a uniform resource locator (URL) of a second search engine, the second search engine to construct a search query which conforms to the restrictive policy to which the content request is subject, and to provide search results which include content which conforms to the restrictive policy to which the content request is subject; and
redirecting the content request to a network location of a landing page, the landing page configured to display a search input element and a submit element of the search engine in association with a message indicative of the restrictive policy.

26. The method of claim 25 wherein the content request includes one or more search keywords/phrases inputted at the requesting computer.

27. The method of claim 26 further comprising pre-populating the search input element at the landing page with the one or more search keywords/phrases.

28. The method of claim 26, wherein the one or more search keywords/phrases are initially provided by the requesting computer to a different search engine, resulting in the determination that the content request is subject to the restrictive policy.

29. The method of claim 25, further comprising constructing a search query based on the content request and configuring the landing page to display a search result of the search query as executed by the search engine.

30. The method of claim 25, wherein the content request comprises an identity associated with the requesting computer.

31. The method of claim 25, further comprising including a link to the content on the landing page.

32. The method of claim 25, further comprising excluding a link to the content from the landing page.

33. A non-transitory computer-readable medium comprising processor-executable instructions configured to perform the method of claim 25.

34. A computer system comprising:
at least one computer configured to:
receive from a requesting computer a content request to a first search engine for network access to content accessible via a network;
obtain a uniform resource locator (URL) of a second search engine, the second search engine to construct a search query which conforms to the restrictive policy to which the content request is subject, and provide search results which include content which conforms to the restrictive policy to which the content request is subject, when determining that the content request is subject to a restrictive policy; and
redirect the content request to a network location of a landing page, the landing page configured to display a search input element and a submit element of the search engine in association with a message indicative of the restrictive policy.

35. The computer system of claim 34 wherein the content request includes one or more search keywords/phrases inputted at the requesting computer.

36. The computer system of claim 35 further comprising pre-populating the search input element at the landing page with the one or more search keywords/phrases.

37. The computer system of claim 35, wherein the one or more search keywords/phrases are initially provided by the requesting computer to a different search engine, resulting in the determination that the content request is subject to the restrictive policy.

38. The computer system of claim 34, wherein the at least one computer is further configured to construct a search query based on the content request and to configure the landing page to display a search result of the search query as executed by the search engine.

39. The computer system of claim 34, wherein the content request comprises an identity associated with the requesting computer.

40. The computer system of claim 34, wherein the at least one computer is further configured to include a link to the content on the landing page.

41. The computer system of claim 34, wherein the at least one computer is further configured to exclude a link to the content from the landing page.

* * * * *